US010569883B2

(12) United States Patent
Newell (10) Patent No.: US 10,569,883 B2
(45) Date of Patent: Feb. 25, 2020

(54) DEPLOYABLE TABLE

(71) Applicant: Thompson Aero Seating Limited, Portadown, Craigavon (GB)

(72) Inventor: Keith Newell, Magherafelt (GB)

(73) Assignee: Thompson Aero Seating Limited, Craigavon, County Armagh (GB)

( * ) Notice: Subject to any disclaimer, the term of this patent is extended or adjusted under 35 U.S.C. 154(b) by 290 days.

(21) Appl. No.: 15/429,880

(22) Filed: Feb. 10, 2017

(65) Prior Publication Data

US 2017/0233078 A1  Aug. 17, 2017

(30) Foreign Application Priority Data

Feb. 11, 2016 (GB) .................................. 1602498.6

(51) Int. Cl.
*B64D 11/06* (2006.01)
*B60N 3/00* (2006.01)
*A47C 7/70* (2006.01)

(52) U.S. Cl.
CPC ............ *B64D 11/0605* (2014.12); *A47C 7/70* (2013.01); *B60N 3/001* (2013.01); *B60N 3/002* (2013.01); *B64D 11/0638* (2014.12)

(58) Field of Classification Search
CPC ............ B64D 11/0605; B64D 11/0638; B60N 3/001; B60N 3/002; A47C 7/68; A47C 7/70
See application file for complete search history.

(56) References Cited

U.S. PATENT DOCUMENTS

| | | | |
|---|---|---|---|
| 3,632,161 A * | 1/1972 | Arfaras ..................... | A47C 7/70 297/145 |
| 4,834,449 A * | 5/1989 | Engelman ................ | A47B 3/14 108/134 |
| 5,050,929 A * | 9/1991 | Gueringer ................ | A47C 7/70 297/145 |
| 8,336,956 B2 | 12/2012 | Westerink et al. | |
| 8,528,968 B2 | 9/2013 | Moulton et al. | |
| 9,150,129 B2 | 10/2015 | Suhre et al. | |
| 9,216,665 B2 | 12/2015 | Herault | |
| 9,481,464 B2 | 11/2016 | Gow et al. | |
| 9,731,829 B2 | 8/2017 | Gow et al. | |
| 2014/0300148 A1 * | 10/2014 | Frost ...................... | B64D 11/06 297/173 |

FOREIGN PATENT DOCUMENTS

| | | |
|---|---|---|
| DE | 19705754 | 8/1998 |
| EP | 1172252 | 1/2002 |
| WO | WO2013/030797 | 3/2013 |

OTHER PUBLICATIONS

UK Search Report for corresponding UK Application No. GB1602498.6, dated Jul. 13, 2016.
European Search Report for corresponding European Application No. EP17155507, dated Jun. 8, 2017.

* cited by examiner

*Primary Examiner* — Ryan D Kwiecinski
(74) *Attorney, Agent, or Firm* — Gardner, Linn, Burkhart & Ondersma LLP (57) ABSTRACT

A seating arrangement comprising at least one seat; a console adjacent the at least one seat; a deployable table assembly; and locking device. The table assembly is movable in a longitudinal direction from a stowed position into a deployed position in which it is located on an upper surface of the console. The locking device is operable to releasably engage the table assembly in the deployed position to prevent movement of the table assembly in a lateral direction.

20 Claims, 12 Drawing Sheets

DEPLOYABLE TABLE

FIELD OF THE INVENTION

This invention relates to a table and in particular to a deployable table for use in a seating arrangement.

BACKGROUND TO THE INVENTION

It is common for seats in vehicle such as aircraft to incorporate some form of deployable table; these are typically designed to take up as little space as possible, as seating space is at a premium in aircraft, particularly so in business class. The table typically employed in economy class in aircraft typically comprises fold-down tables which are coupled to the back wall of a seating arrangement, which when not in use are held in a substantially flush position via a cam mechanism. In business class there is a wider variety of tables available ranging from those which slide out from a central console on an arcuate rail mechanism, to those which fold out to provide a table with a plurality of leaves.

The movements required to enable deployment of commonly used tables such as those described previously are typically overcomplicated and prevent rapid ingress/egress from the seat when the table is in its deployed position, therefore there exists a need to provide a deployable table for an aircraft which takes up minimal space and transitions rapidly between deployed and stowed positions whilst still providing a stable rest or work surface.

SUMMARY OF THE INVENTION

Accordingly, the invention provides a seating arrangement comprising at least one seat; a console adjacent the at least one seat; a deployable table assembly; and locking device, wherein the table assembly is movable in a longitudinal direction from a stowed position into a deployed position in which it is located on an upper surface of said console, and wherein the locking device is operable to releasably engage the table assembly in the deployed position to prevent movement of the table assembly in a lateral direction.

In one aspect, the console includes a recess for receiving the table assembly in the stowed position, said table assembly being movable into and out of said recess in the longitudinal direction.

In another aspect, the table assembly includes a table, the table being disposed in a vertical orientation when in the stowed position.

In yet another aspect, the console comprises base and upper portions, the table assembly being located in the upper portion in the stowed position.

Optionally, the table assembly comprises a table and a carriage for the table.

In a further aspect, the locking device is operable to releasably engage the carriage.

In still another aspect, the table is pivotably coupled to the carriage for pivoting movement about an axis that extends in the longitudinal direction.

In a still further aspect, the table is pivotable about the axis between a vertical orientation and a horizontal orientation, the table adopting the horizontal orientation in the deployed position.

In another aspect, the table is pivotably coupled to the carriage by at least one hinge.

In another aspect, the carriage includes a device for facilitating movement of the carriage such as one or more wheels, rollers, rails and/or slides.

In a further aspect, the seating arrangement further includes an actuation device operable to move the table assembly from the stowed position towards the deployed position, the actuation device optionally comprising resilient biasing element arranged to urge the table assembly towards the deployed position.

In a still further aspect, the actuation device is operable by a controller to actuate the table from the stowed position into a primary intermediate position.

In yet another aspect, the actuation device comprises at least one spring coupled to a ram.

In another aspect, the controller comprises a switch which is in mechanical or electrical communication with the actuation device.

In a further aspect, the locking device comprises a latch that is releasably engageable with a corresponding latch-receiving recess provided in the table assembly.

Optionally, the latch is movable between a retracted state in which it is located within the console and an extended state in which it projects upwardly from the upper surface of the console.

Optionally, the latch and the latch-receiving recess are aligned with one another when the table assembly is in the deployed position.

Optionally, the latch and latch-receiving recess are shaped and dimensioned to prevent lateral movement of the table assembly relative to the console when mutually engaged.

In another aspect, the locking device is co-operable with the table assembly such that movement of the table assembly from the stowed position into a secondary intermediate position causes the latch to move from its retracted state to its extended state.

In still another aspect, the locking device is co-operable with the table assembly such that movement of the table assembly from a secondary intermediate state towards the stowed position causes the latch to move from its extended state to its retracted state.

Optionally, the locking device includes a linkage mechanism that couples the table assembly to the latch in order to actuate the latch from the retracted state to the extended state in response to movement of the table assembly into the second intermediate position.

In a further aspect, wherein the linkage mechanism includes a linkage that is pivotably coupled to the console and to the latch in order to translate movement of the table assembly in the longitudinal direction into upwards movement of the latch.

In yet another aspect, the latch is movable from its engaged state to its retracted state by engagement with a surface of the latch-receiving recess as the table assembly moves from the secondary intermediate state to the stowed position.

Optionally, at least one support member is provided on the in-use underside of the table, the at least one support member being engageable with the upper surface of the console when the table is in the deployed position.

In a still further aspect, the at least one support member is deployable between a use position in which it projects from the underside of the table and a stowed position in which it is located in or against the table.

In another aspect, the at least one support member is resiliently biased to adopt its deployed state.

In a further aspect, the table assembly incorporates an abutment device operable to prevent movement of the table assembly in a longitudinal direction in-use.

In a still further aspect, the abutment device comprises at least one spring coupled to a lever, wherein the lever is pivotably coupled to a pin which is operable to releasably engage a cavity in-use.

BRIEF DESCRIPTION OF THE DRAWINGS

An embodiment of the invention will now be described, by way of example, with reference to the accompanying drawings, in which.

DETAILED DESCRIPTION OF THE DRAWINGS

Figure 1:
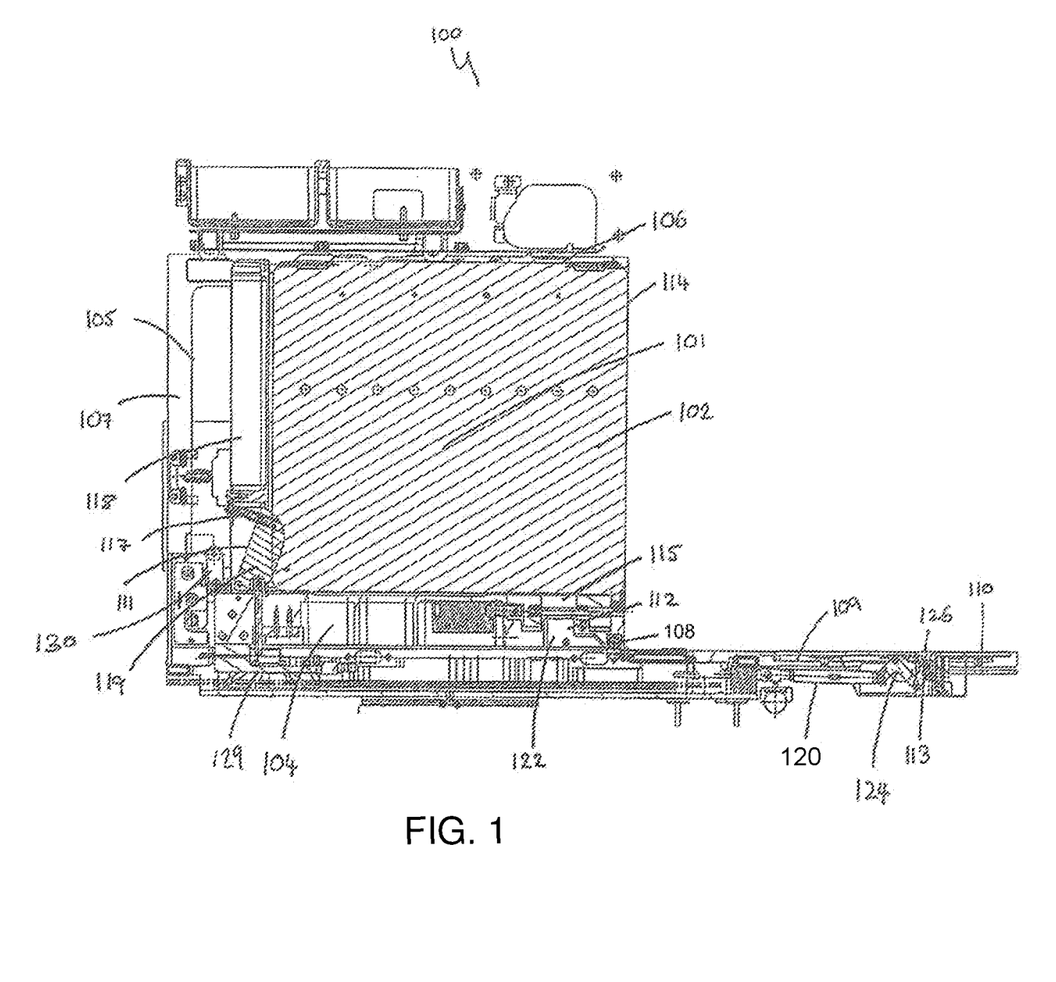
FIG. 1 is a side sectional view showing part of a seating arrangement and showing a deployable table in a stowed position, the table embodying one aspect of the present invention.
Figure 9:
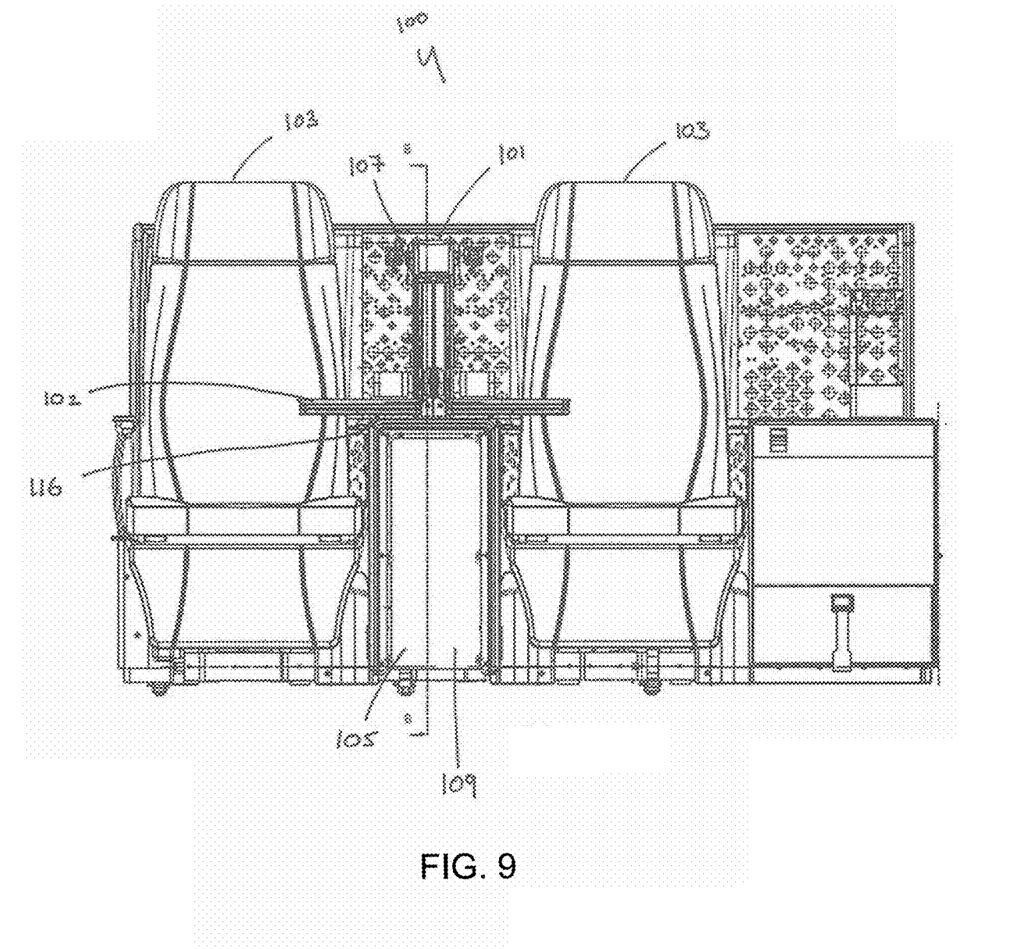
FIG. 9 is a front perspective view of the seating arrangement showing the deployable table of FIG. 1 in a deployed position.

FIGS. 1 to 4 show a seating arrangement 100, in particular an aircraft seating arrangement, embodying one exemplary aspect of the invention, the seating arrangement incorporating a deployable table assembly 101 embodying another exemplary aspect of the invention. The deployable table assembly 101 incorporates a table 102 and a table deployment mechanism 104, which is configured to transition the table 102 between stowed and deployed positions (as shown in FIGS. 1 and 9 respectively). This transition typically incorporates one or more intermediate positions (shown in FIG. 5) in-use. As can best be seen from FIG. 9, the seating arrangement 100 comprises at least one seat 103 and a console 105 located adjacent the seat 103. Where the seating arrangement 101 comprises two (or more) seats 103 that are side-by-side, the, or a respective, console 105 is located between adjacent seats 103. The table 102 may comprise a single leaf table; however it may alternatively comprise multiple leaves.

Figure 8:
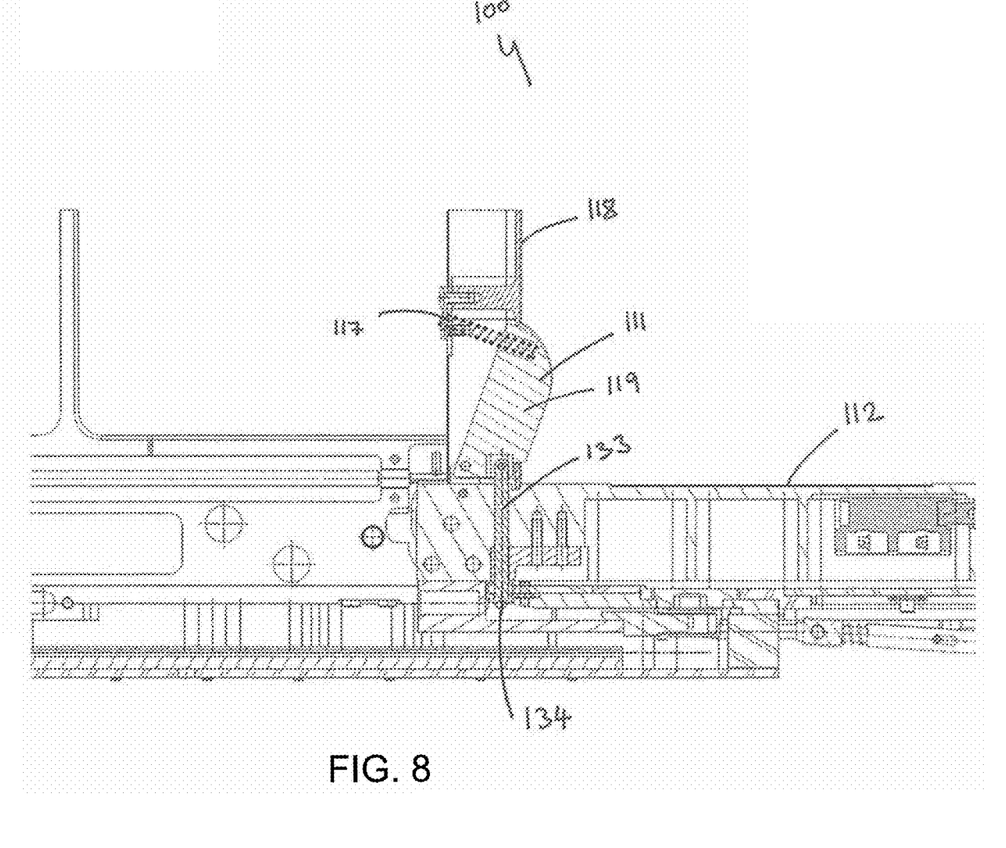
FIG. 8 is a sectional view of the seating arrangement of the deployable table of FIG. 1 in the deployed position.

In the stowed position (as shown in FIGS. 1 to 4), the deployable table comprising the table 102 and table deployment mechanism 104 is provided within the console 105. In the illustrated embodiment, the console 105 is shaped and dimensioned to define a recess 106 therein, within which the table 102 and at least part of the table deployment mechanism 104 may be disposed when in the stowed position. Furthermore, the console 105 may incorporate one or more additional deployable table assemblies 101 such that where, for example, the seating arrangement 100 incorporates first and second seats 103 with a console 105 located therebetween (as shown in FIG. 8), each occupant may be provided with their own deployable table assembly 101, with both typically being provided within the same console 105 (see FIG. 8). The recess 106 typically includes an aperture 114 through which the table 102 passes when transitioning between stowed and deployed positions.

The console 105 typically comprises a base portion 109 and an upper portion 107 with the table 102 typically being stowed in the upper portion 107, the table deployment mechanism 104 typically being provided, at least in part, in both the upper and base portions 107, 109. The upper portion 107 is coupled to or mounted on the base portion 109. The upper portion 107 is typically larger in dimension than the base portion 107, such that the upper portion 107 occupies only part of the surface area of an upper face 110 of the base portion 109, upon which the upper portion 107 is provided. Advantageously, when the table 102 is in the stowed position, the surface area of the upper face 110 of the base portion 109 which is not occupied by the upper portion 107 may provide an armrest or support surface for one or more objects for an occupant of the seat 103.

The table 102 is stowed within the console 105 such that in the stowed position the table 102 is disposed substantially perpendicular to the ground surface on which the seating arrangement 100 rests during use. This orientation, which may be referred to as a vertical orientation, is substantially perpendicular to the orientation of the table when in the deployed position (which may be referred to as a horizontal orientation). The table 102 may be coupled to the table deployment mechanism 104 by any suitable coupling device. The table deployment mechanism 104 typically comprises a carriage 112, abutment device 111, actuation device 130, and is advantageously co-operable with locking device 113 as is described in more detail hereinafter. The carriage 112 is movable back and forth into and out of the recess 106 via the aperture 114 in a longitudinal direction that, in preferred embodiments, is substantially parallel with the direction in which a seated passenger faces. The table 102 is mounted on the carriage 112 and so is movable into and out of the recess 106 via the aperture 114 in the longitudinal direction. In preferred embodiments, the table 102 is in its vertical orientation during such movement. The carriage 112 typically includes a device for facilitating movement of the carriage such as one or more wheel(s), roller(s), rails(s) and/or slides(s). In the illustrated embodiment wheel 108 is provided for this purpose.

The table 102 is coupled to the carriage 112 via at least one pivot device 115 such as a hinge. Advantageously, the table 102 is pivotable about the hinge such that when in the deployed position the table is disposed substantially parallel to the ground surface on which the seating arrangement 100 rests during use (as shown in FIG. 8), i.e, the table is in the horizontal orientation.

The actuation device 130 is operable to actuate the table 102 towards a primary intermediate position in-use (not shown). The actuation device 130 typically comprises at least one resilient biasing member arranged to urge the table out of the recess 106 into the primary intermediate position.

The actuation device 130 typically comprises a spring coupled to a ram. When the table 102 is in the stowed position the actuation device 130 is typically in a primed state. For example where the actuation device 130 comprises a resilient biasing element such as a spring, this may be in a compressed state and arranged to urge the table towards the primary intermediate position. Further in the stowed position the actuation device 130 is positioned such as to abut the carriage 112. The actuation device 130 is typically coupled to a controller (not shown), typically comprising a user-operable latch, which upon activation is configured to release the actuation device 130 from its primed state, whereby the actuation device 130 urges the table 102 into the primary intermediate position. Alternatively, a user-operable latch may be coupled to the table 102 or carriage 112 to selectively prevent movement of the table under the bias of the actuation device 130 until the latch is released. In the primary intermediate position at least part of the table 102 extends out of the aperture 114 of the console 105. Advantageously, when the table 102 is in the primary intermediate position it is movable into a secondary intermediate position (shown in FIGS. 5 to 7) via a user pulling the table 102 from the console 105, or, alternatively the table deployment mechanism 104 may incorporate an additional actuation device (not shown), such as a motor, which is configured to displace the table into the secondary intermediate position upon activation of the actuation device 130. The controller (not shown) is typically provided upon the central console 105, such as upon the base portion 109. The controller is typically in mechanical or electrical communication with the actuation device 130. The actuation device 130 may be provided on a rear wall of the recess 106.

The abutment device 111 may be provided on a rear portion 118 of the carriage 112, the rear portion 118 typically extending substantially perpendicular to the body of the carriage 112 in an upward direction. In the illustrated embodiment, the abutment device 111 comprises a spring 117 coupled to a lever 119. In the stowed position, the lever 119 and the rear portion 118 provide an elongate supporting edge. In the stowed position the abutment device 111 is typically in a primed state. For example where the abutment device 111 comprises a resilient biasing element such as a spring, this may be in a compressed state. Further in the stowed position the abutment device 111 is positioned such as to abut the table 102. Advantageously, in the secondary intermediate position and the deployed position the rear portion 118 of the carriage 112 is adapted to substantially occupy the dimensions of the aperture 114 of the console 105. Further advantageously, in the deployed position (as shown in FIGS. 8 and 9) the lever 119 is adapted to extend out of, at least in part, the aperture 114 in-use. The abutment device 111 is typically pivotably coupled to a pin 133, which is extendable into a cavity 134. The pin 133 typically extends substantially through the carriage 112, in a downward direction. The cavity 134 is shaped and dimensioned to receive the pin 133 such that the pin 133 is operable to releasably engage the cavity 134 when the deployable table 101 is in the deployed position.

Figure 5:
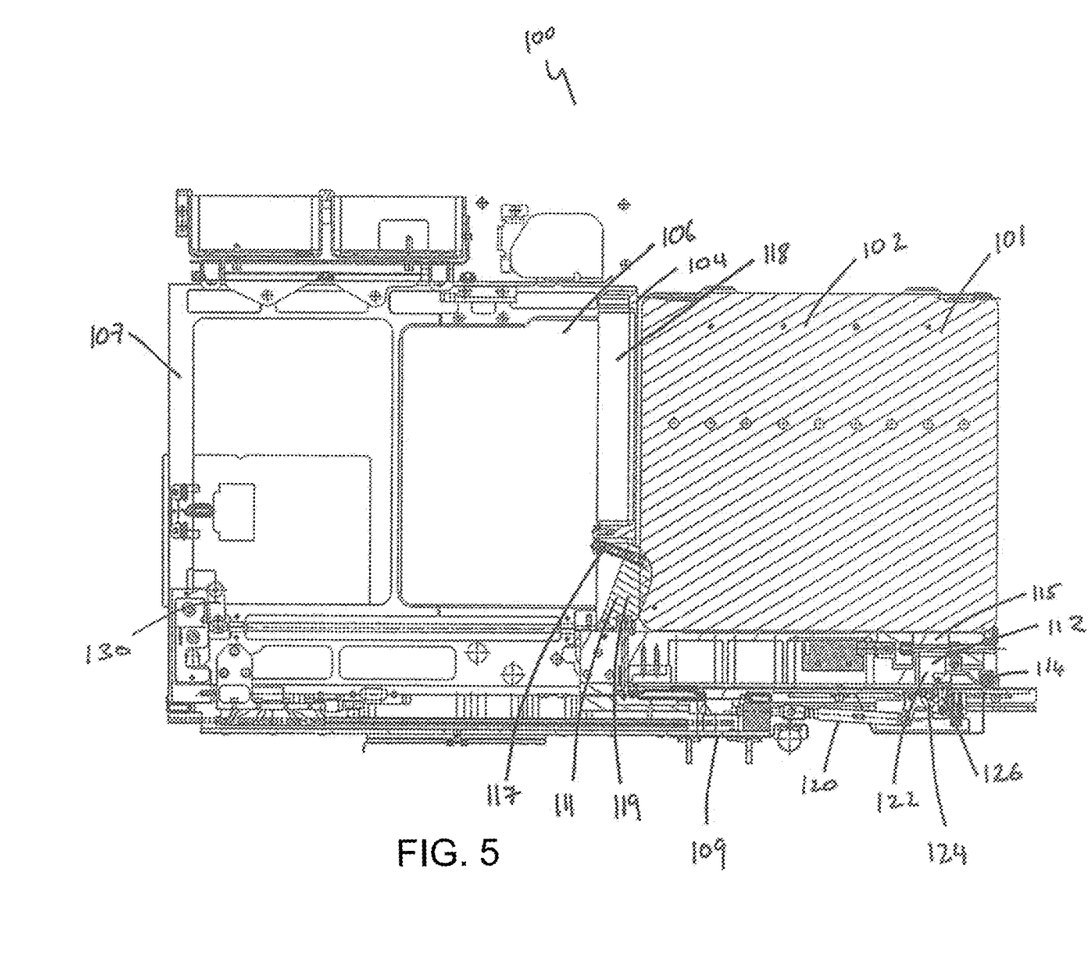
FIG. 5 is a side sectional view of the deployable table of FIG. 1 in a secondary intermediate position.

The table 102 is pivotable about a horizontal axis extending in the longitudinal direction when in the secondary intermediate position (as shown in FIG. 5), where the horizontal axis is to be understood to comprise the axis extending longitudinally substantially parallel with the ground surface upon which the seating arrangement 101 rests during use. Typically the table 102 is configured to pivot through approximately 90° from its secondary intermediate position to its deployed position such that the table 102, when pivoted into the deployed position is substantially horizontally disposed and extends across the respective seat 103 (i.e. in front of a seated passenger in use). The table 102 is optionally configured to pivot only in one direction from the secondary intermediate position and, to this end, the pivot device 115, which typically comprises a hinge, may include a stop for preventing the table 102 from pivoting in the opposite direction relative to the seat 103. Advantageously, where the seating arrangement 101 incorporates two seats with the central console 105 being located therebetween, there is typically provided a deployable table assembly 101 for each respective seat 103. Furthermore, the pivot device 115 for each table 102 provided within the console 105 are configured to pivot in opposing directions when transitioning from the secondary intermediate position to the deployment position (as shown in FIG. 8).

As the table 102 pivots into the deployed position the lever 119 of the abutment device 111 is configured to pivot out of the aperture 114 in a substantially longitudinal direction in-use into an extended position (as shown in FIG. 8). Reciprocally the pin 133 is configured to extend in a substantially lateral direction to releasably engage the cavity 134. Advantageously this engagement is operable to lock the abutment device 111 in the extended position in-use. In the extended position the abutment device 111 is configured to prevent movement of the table 102 in the longitudinal direction in-use. The abutment device 111 is further configured such that when the table 102 is pivoted back into the secondary intermediate position, the in-use topside of the table 102 is operable to abut the lever 119 of the abutment device 111. Advantageously, the lever 119 is operable to retract into the recess 10 upon contact with the table 102, to this end the lever 119 is chamfered such as to provide a substantially round peripheral edge, Locking device 113, which is shown to include an extendable latch 126, is configured to releasably engage the carriage 112 when the table 102 is in the deployed position. The latch 126 is provided on the base portion 109 of the console 105 in the region in front of the upper portion 107. The latch 126 is movable between a retracted state (see for example FIG. 2) in which it is located within the console 105 (optionally, such that its upper surface is substantially flush with the upper surface 110 of the console 105) and an extended state (see for example FIG. 6) in which it projects upwardly from the upper surface 110 of the console 105), typically through an aperture 127 formed in the surface 110. The carriage 112 includes a corresponding latch-receiving recess 122 in its underside, in which the latch 126 is located in its extended state, i.e. when the locking device is engaged. The arrangement is such that the latch 126 and the recess 122 are aligned with one another when the table 102 is in its secondary intermediate position (and also the deployed position).

The locking device 113 is provided on the console 105 and, when the latch 126 is engaged with the carriage, prevents relative movement between the carriage 112 and the console 105 in a lateral direction at least, the lateral direction being perpendicular to the longitudinal direction, i.e. a direction that is transverse with respect to the seat 103. Advantageously, this engagement prevents lateral movement of the table 102 relative to the console 105.

Optionally, the locking device 113 is coupled to or otherwise co-operable with the carriage 112 such that movement of the carriage 112 into the secondary intermediate state causes the latch 126 to adopt its extended state. The locking device 113 is may also be coupled to or otherwise co-operable with the carriage 112 such that movement of the carriage 112 from the secondary intermediate state towards the stowed position causes the latch 126 to adopt its retracted state.

In preferred embodiments, the locking device 113 includes a linkage mechanism 123 that couples the carriage 112 to the latch 126 in order to actuate the latch 126 from the retracted state to the extended state in response to movement of the carriage 112, from the first intermediate position to the second intermediate position. In the illustrated embodiment, the linkage mechanism 123 couples with a part 129 of the carriage 112 that is located below the surface 110. The coupling may be fixed (e.g. by way of a cable (not shown)) or may involve engagement of the part 129 and the linkage mechanism 123 as the carriage 112 moves towards the secondary intermediate position. Typically, the linkage mechanism 123 includes a linkage 124 that is pivotably coupled to the console 105 and to the latch 126 in order to translate movement of the carriage 112 in the longitudinal direction into upwards movement of the latch 126. The illustrated linkage mechanism 123 includes a linkage member 120 that couples between the linkage 124 to the carriage part 129 in order to pivot the linkage 124 in response to movement of the carriage 112 towards the secondary intermediate position thereby moving the latch 126 to its engaged state. The preferred arrangement is such that the latch 126 is actuated into its engaged state at substantially the same time as the carriage 112 reaches the secondary intermediate position.

In preferred embodiments, the latch 126 is moved to its retracted state by engagement with the carriage 112 as the carriage moves from the secondary intermediate state to the stowed position. This may be achieved by providing the foremost (in the longitudinal direction) surface of the latch 126 and/or the foremost surface of the recess 122 with a shape that causes the latch 126 to be pushed downwards when the recess 122 engages with the latch 126 as the carriage moves from the secondary intermediate state to the stowed position. In the illustrated embodiment, and as can best be seen from FIG. 6, the foremost surface 131 of the recess 122 is oblique with respect to the direction of movement of the carriage such that it pushes the latch 126 downwards when the carriage moves.

It will be seen from the foregoing that displacement of the carriage 112 from the stowed to the second intermediate position actuates the linkage assembly 123 which in turn causes the latch 126 to extend from the base portion 109. Advantageously, when the latch 126 extends into the recess 122, it prevents lateral movement of the carriage 112, and therefore the table 102 by engagement with the internal lateral surface(s) of the recess 122.

Figure 2:
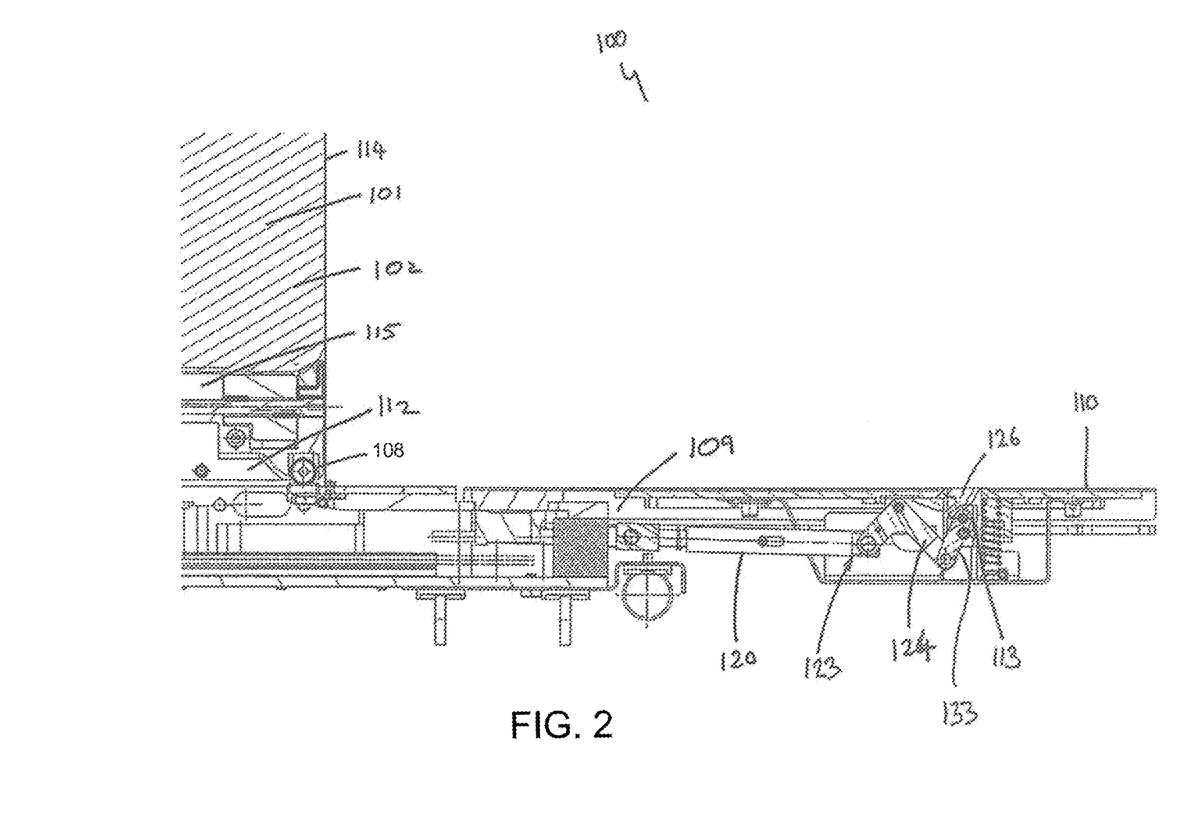
FIG. 2 is an enlarged side sectional view of a locking device of the deployable table of FIG. 1.
Figure 3:
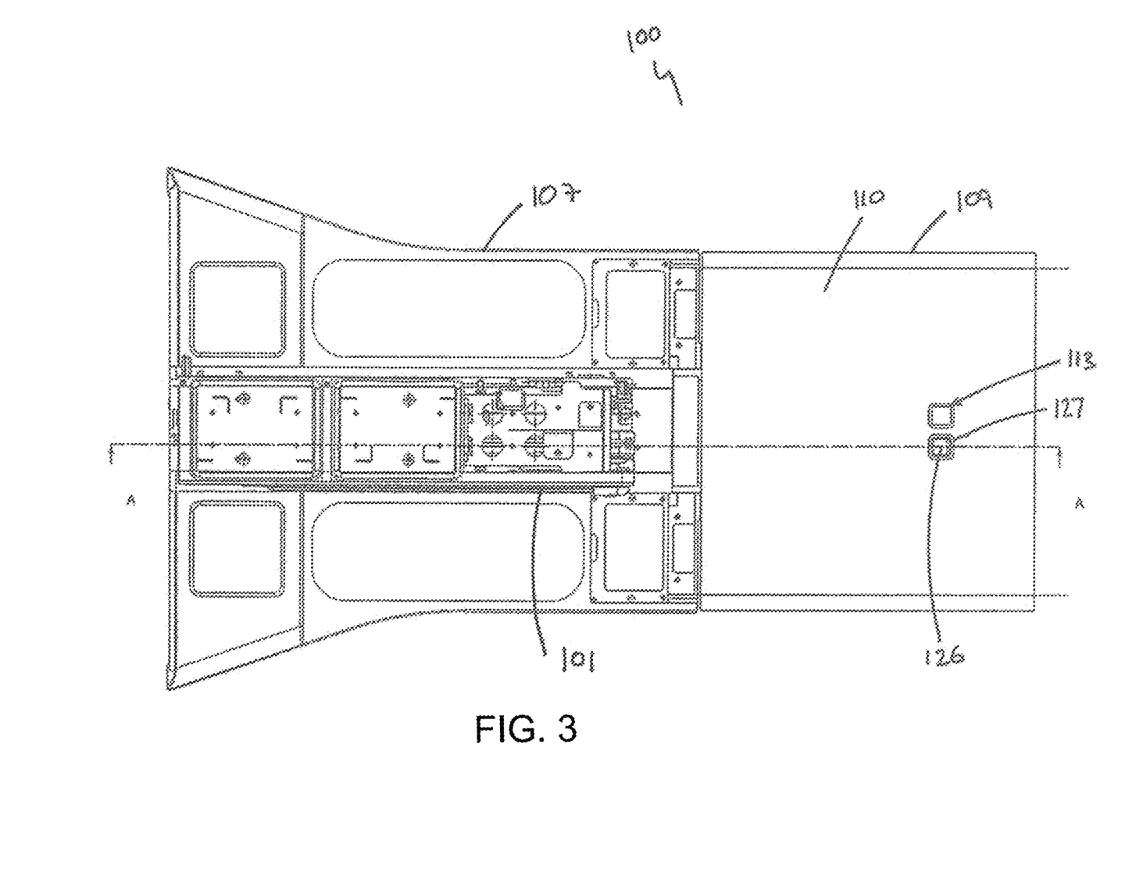
FIG. 3 is a plan view of the deployable table of FIG. 1 in the stowed position.
Figure 4:
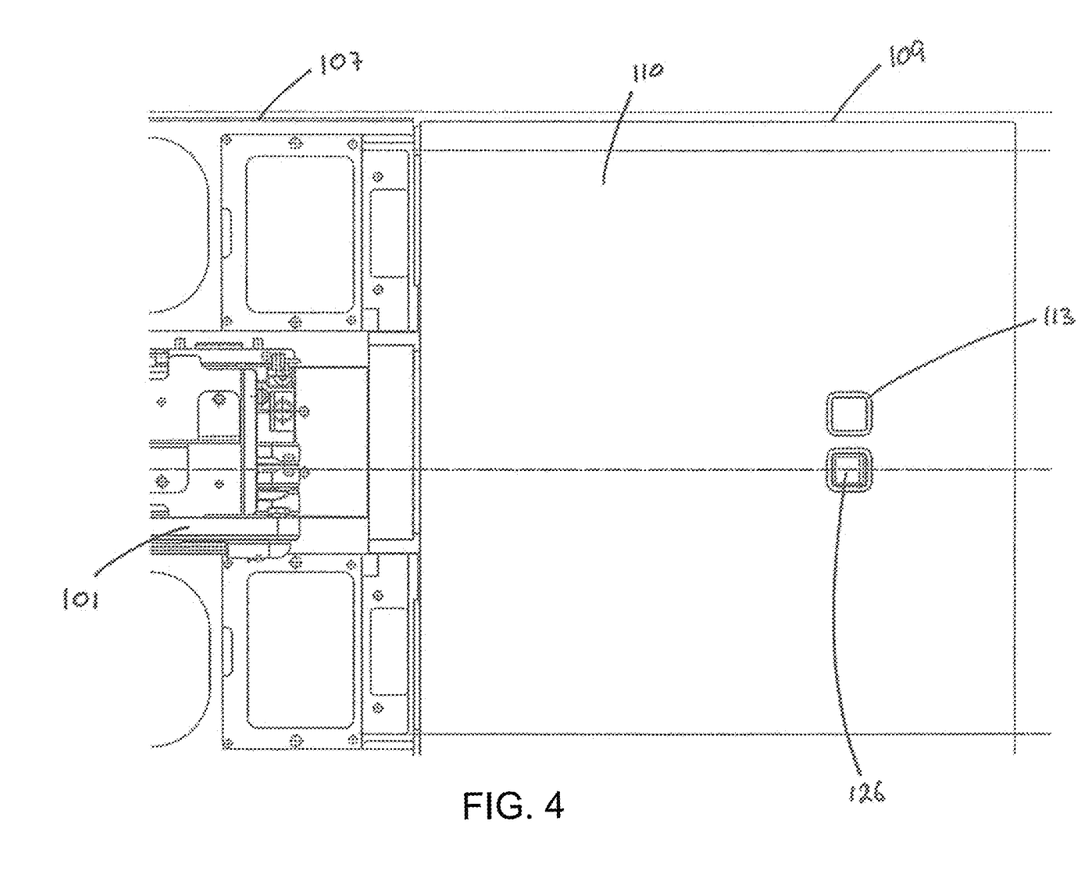
FIG. 4 is an enlarged plan view of the deployable table of FIG. 1 in the stowed position.

The locking device 113 is conveniently provided within the console 105, typically within the base portion 109 and is configured to extend therefrom. Typically the locking device 113, and more particularly the latch 126, extends from the upper face 110 of the base portion 109 in-use. In the stowed position the latch 126 is retractable within the base portion 109, such that it is substantially flush with the upper face 110 (as shown in FIGS. 2 to 4). The linkages 120, 124 may comprise one or more connecting rods comprising metal and/or plastic and/or a composite material or any other suitable material. The linkages 120, 124 may incorporate one or more resilient biasing elements, such as a spring, to assist movement of the latch 126 into and/or out of its extended state. The linkage 120 may comprise a rod, optionally incorporating a biasing element, which is coupled to the carriage 112 at one end and to one end of the pivotable linkage 124 at the other. The other end of the linkage 124 is coupled to the latch 126, e.g. by a further link 133, such that the linkage 124, when pivoted, extends the latch 126. To this end, the linkage, or lever, 124 is pivotably coupled to the base portion 109, such that the displacement of the rod 122 in the longitudinal (or forward) direction causes pivoting movement of the lever 124.

Figure 10:
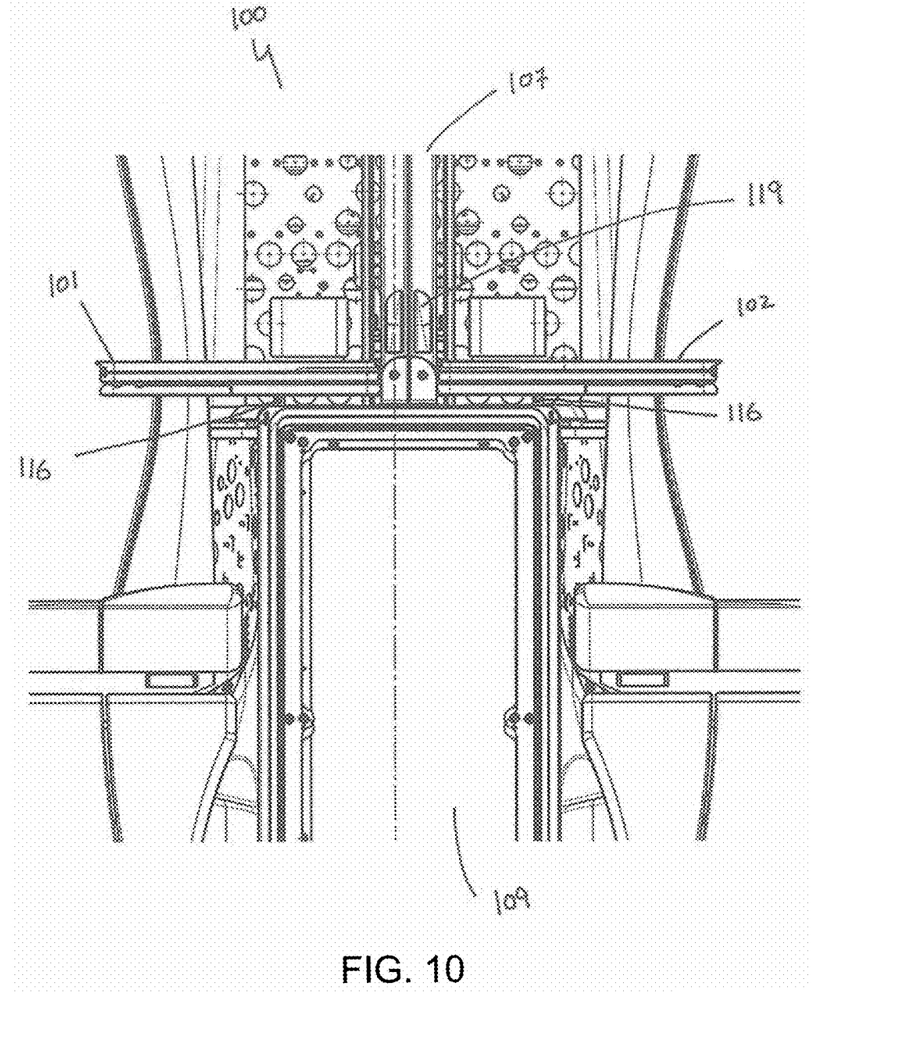
FIG. 10 is an enlarged front perspective view of the seating arrangement showing the deployable table of FIG. 1 in a deployed position.
Figure 11:
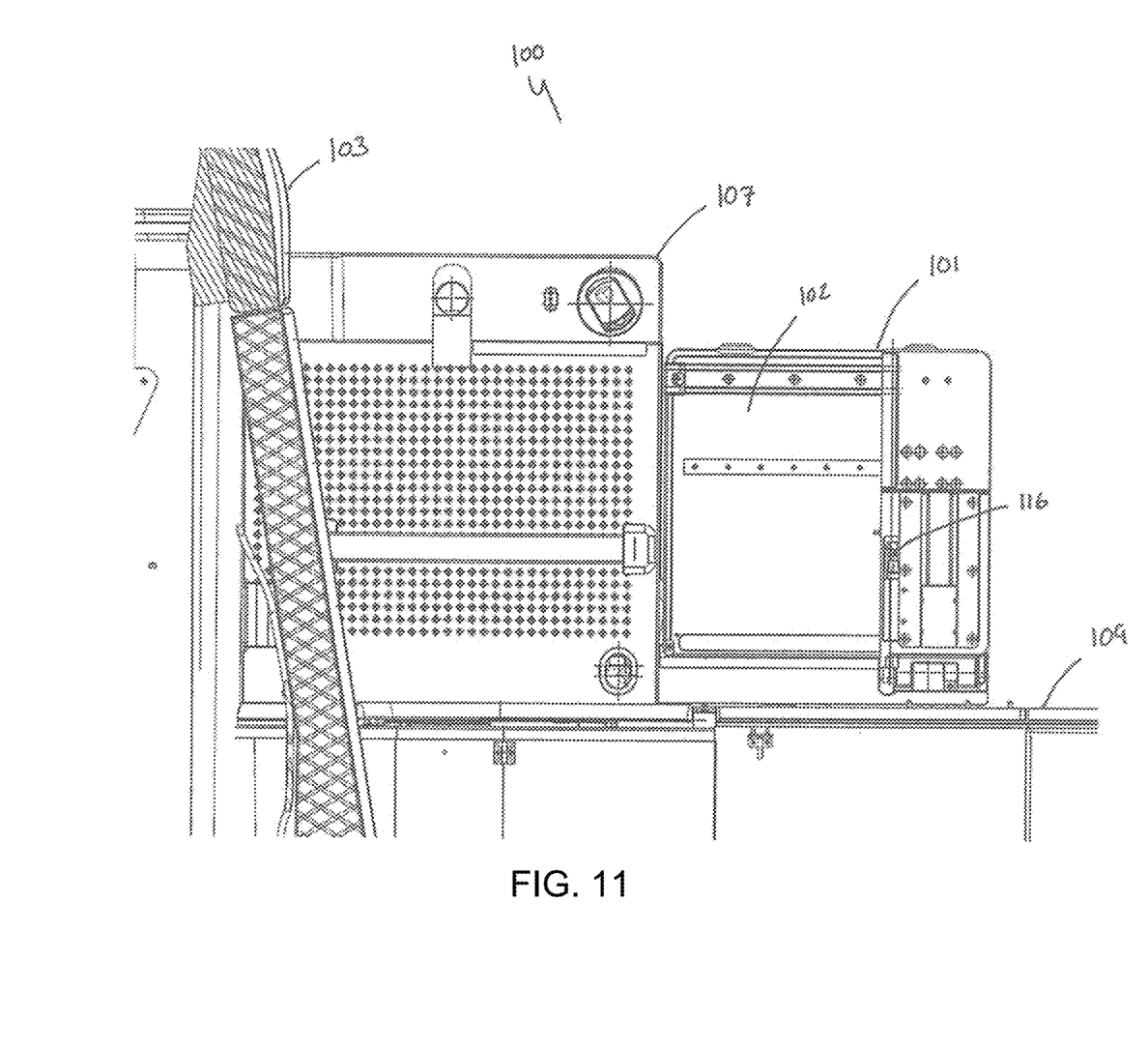
FIG. 11 is a sectional side view of the seating arrangement showing the deployable table of FIG. 1 in the intermediate position.
Figure 12:
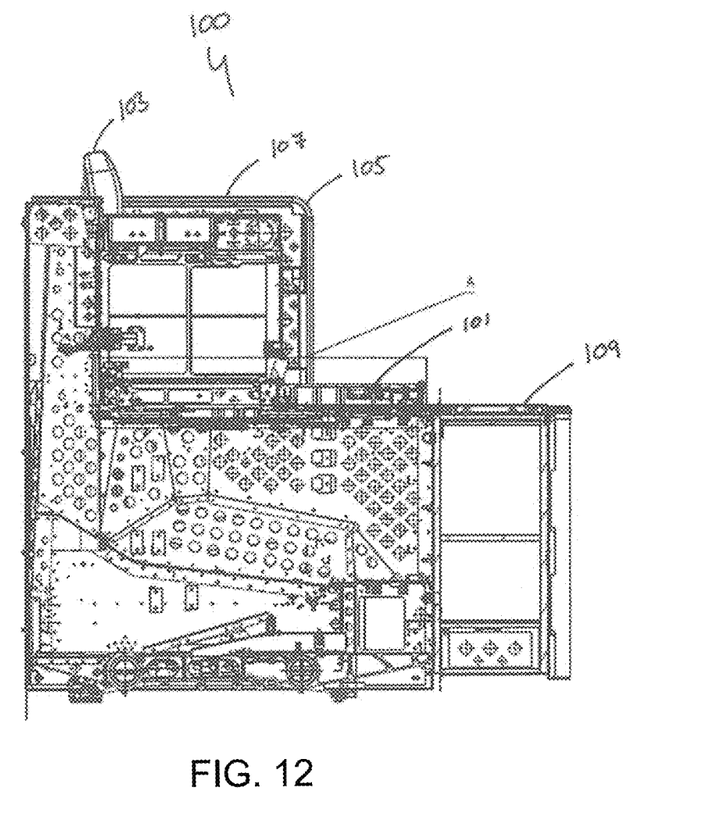
FIG. 12 is a sectional side view of the seating arrangement showing the deployable table of FIG. 1 in the deployed position.

Advantageously, one or more support members 116 are provided for supporting the table 102 on the upper surface 110 when in the deployed position. The or each support member 116, which may take the form of a leg or other projection, is provided on the in-use underside of the table 102 and may be retractable into or foldable against the underside of the table 112. As such, the support member 116 is deployable between a use position in which it projects from the underside of the table and a stowed position in which it is located in or against said table. The, or each, support member 116 is configured such that when the deployable table 101 is in the stowed position, the support member 116 is folded against the table 102, and may lie substantially flat against the underside (as shown in FIG. 10), or may be retracted into the table. Further advantageously, the, or each, support member 116 is configured such that when the deployable table 101 is in the deployed position the support member 116 extends substantially perpendicular to the table 102, whereby it is configured to rest upon the base portion 109, such as upon the upper face 110 thereof (as shown in FIGS. 8 and 9). The, or each, support member 116 may be resiliently biased to adopt its use position such that the use position is adopted as the table emerges from the recess 106.

Figure 6:
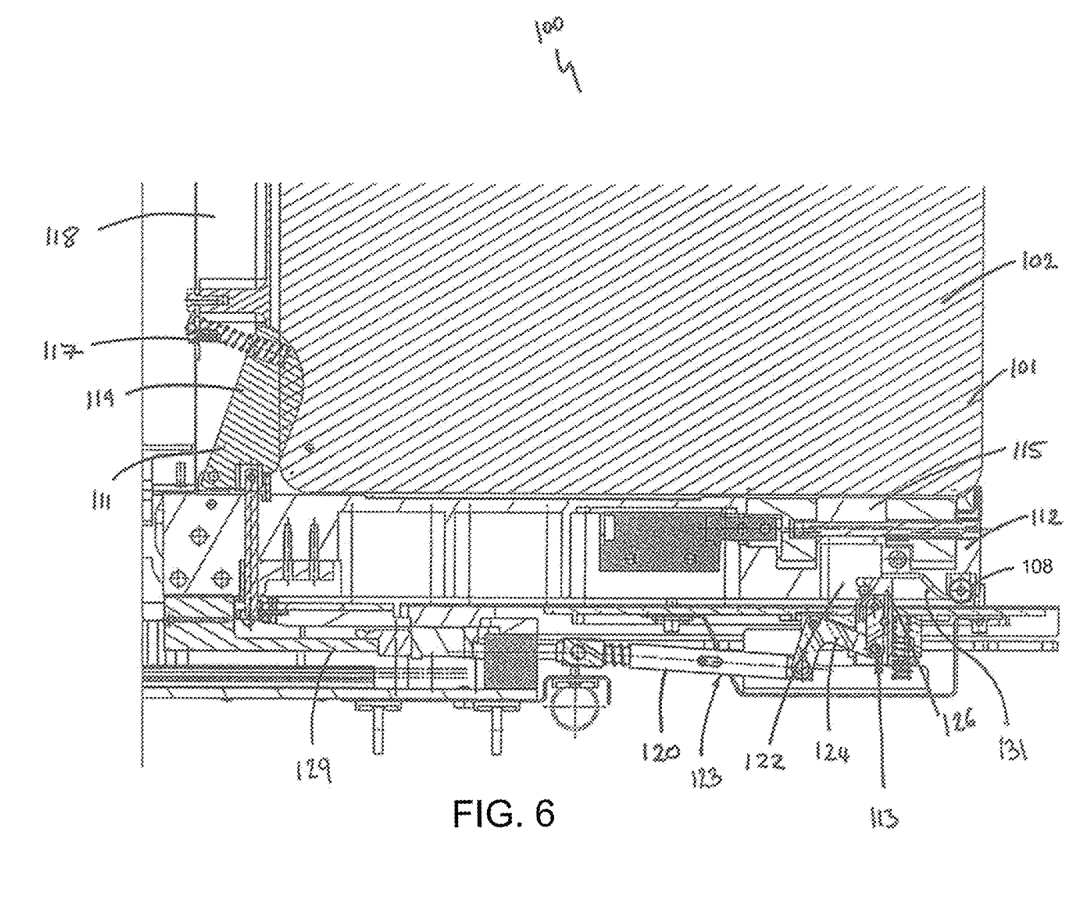
FIG. 6 is an enlarged side sectional view of the deployable table of FIG. 1 in the secondary intermediate position showing the engagement of the locking device.
Figure 7:
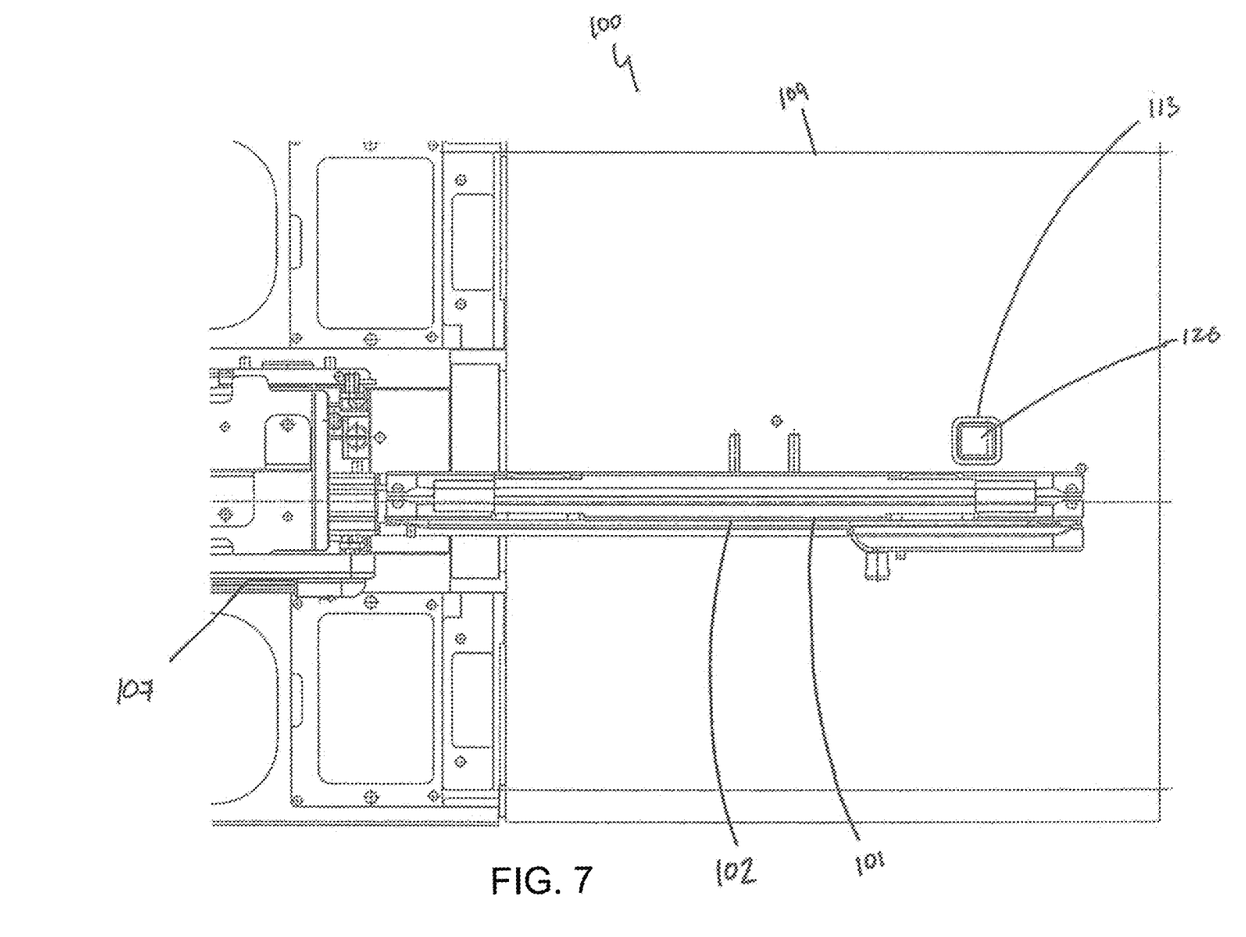
FIG. 7 is a plan view of the deployable table of FIG. 1 in the secondary intermediate position.

In-use when the deployable table 101 is stowed within the console 105 and the user activates the actuation device 130, the table 102 moves to the primary intermediate position (as shown in FIGS. 1 to 4). The table 102 may then be pulled by the user into the secondary intermediate position (as shown in FIGS. 5 to 7). As the deployable table 101 is transitioning between the primary and secondary intermediate positions, the forward movement of the carriage 112 operates the locking device 113 causing the latch 12 to extend from the console 105 into the recess 122. The table 102 is pivotable about the pivot device 115 into the deployed position (as shown in FIG. 8) whereupon the abutment device 111 is configured to releasably lock in an extended position. Advantageously, when the table 102 is in its deployed position, the locking device 113 provides stability, in particular by preventing or at least restricting lateral movement of the table 102. Stability is further enhanced by the support member 116. Tables embodying the invention can therefore be easily deployed and stowed and are stable in use.

The invention is not limited to the embodiment(s) described herein but can be amended or modified without departing from the scope of the present invention.

The invention claimed is:

1. A seating arrangement comprising:
at least one seat;
a console adjacent said at least one seat;
a deployable table assembly; and
a locking device;
wherein said table assembly is movable in a longitudinal direction from a stowed position into a deployed position in which said table assembly is located on an upper surface of said console, and wherein said locking device is operable to releasably engage said table assembly in said deployed position to prevent movement of said table assembly in a lateral direction; and wherein said locking device comprises a latch that is releasably engageable with a corresponding latch-receiving recess provided in the table assembly, wherein said latch is movable between a retracted state in which it is located within the console and an extended state in which it projects upwardly from said upper surface of the console.

2. The seating arrangement as claimed in claim 1, wherein said console includes a recess for receiving said table assembly in said stowed position, said table assembly being movable into and out of said recess in said longitudinal direction.

3. The seating arrangement as claimed in claim 1, wherein said table assembly includes a table, said table being disposed in a vertical orientation when in said stowed position.

4. The seating arrangement as claimed in claim 1, wherein said console comprises base and upper portions, said table assembly being located in said upper portion of said console when said table assembly is in said stowed position.

5. The seating arrangement as claimed in claim 1, wherein said table assembly comprises a table and a carriage for said table, and wherein said locking device is operable to releasably engage said carriage.

6. The seating arrangement as claimed in claim 5, wherein said table is pivotably coupled to said carriage for pivoting movement about an axis that extends in said longitudinal direction.

7. The seating arrangement as claimed in claim 6, wherein said table is pivotable about said axis between a vertical orientation and a horizontal orientation, said table adopting said horizontal orientation in said deployed position, and wherein said table is pivotably coupled to said carriage by at least one hinge.

8. The seating arrangement as claimed in claim 5, wherein said carriage includes a device for facilitating movement of said carriage, wherein said device for facilitating movement of said carriage comprises at least one chosen from a wheel, a roller, rails, and a slide.

9. The seating arrangement as claimed in claim 5, wherein at least one support member is provided on an in-use underside of said table, said at least one support member being engageable with said upper surface of said console when said table is in said deployed position.

10. The seating arrangement as claimed in claim 1, further including an actuation device operable to move said table assembly from said stowed position towards said deployed position, said actuation device comprising one or both of (1) resilient biasing elements arranged to urge said table assembly towards said deployed position, and (2) at least one spring coupled to a ram.

11. The seating arrangement as claimed in claim 10, wherein said actuation device is operable by a controller to actuate said table from said stowed position into a primary intermediate position, and wherein said controller comprises a switch that is in mechanical or electrical communication with said actuation device.

12. The seating arrangement of claim 1, wherein said latch and said latch-receiving recess are aligned with one another when said table assembly is in said deployed position, and wherein said latch and said latch-receiving recess are shaped and dimensioned to prevent lateral movement of said table assembly relative to said console when said latch and said latch-receiving recess are mutually engaged.

13. The seating arrangement of claim 1, wherein said locking device is co-operable with said table assembly such that movement of said table assembly from said stowed position into a secondary intermediate position causes said latch to move from its retracted state to its extended state.

14. The seating arrangement of claim 13, wherein said locking device includes a linkage mechanism that couples said table assembly to said latch in order to actuate said latch from said retracted state to said extended state in response to movement of said table assembly into said second intermediate position.

15. The seating arrangement of claim 14, wherein said linkage mechanism includes a linkage that is pivotably coupled to said console and to said latch in order to translate movement of said table assembly in said longitudinal direction into upwards movement of said latch.

16. The seating arrangement of claim 1, wherein said locking device is co-operable with said table assembly such that movement of said table assembly from a secondary intermediate state towards said stowed position causes said latch to move from said extended state to said retracted state.

17. The seating arrangement of claim 16, wherein said latch is movable from said engaged state to said retracted state by engagement with a surface of said latch-receiving recess as said table assembly moves from said secondary intermediate state to said stowed position.

18. The seating arrangement as claimed in claim 1, wherein said table assembly incorporates an abutment device operable to prevent movement of said table assembly in a longitudinal direction in-use, said abutment device comprising at least one spring coupled to a lever, wherein said lever is pivotably coupled to a pin which is operable to releasably engage a cavity in-use.

19. A seating arrangement comprising:
at least one seat;
a console adjacent said at least one seat;
a deployable table assembly; and
a locking device;
wherein said table assembly is movable in a longitudinal direction from a stowed position into a deployed position in which said table assembly is located on an upper surface of said console, and wherein said locking device is operable to releasably engage said table assembly in said deployed position to prevent movement of said table assembly in a lateral direction;
wherein said locking device comprises a latch that is releasably engageable with a corresponding latch-receiving recess provided in said table assembly; and
wherein said locking device is co-operable with said table assembly such that movement of said table assembly from said stowed position into a secondary intermediate position causes said latch to move from its retracted state to its extended state.

20. A seating arrangement comprising:
at least one seat;
a console adjacent said at least one seat;
a deployable table assembly; and
a locking device;
wherein said table assembly is movable in a longitudinal direction from a stowed position into a deployed position in which said table assembly is located on an upper surface of said console, and wherein said locking device is operable to releasably engage said table assembly in said deployed position to prevent movement of said table assembly in a lateral direction;
wherein said table assembly comprises a table and a carriage for said table;
wherein at least one support member is provided on an in-use underside of said table, said at least one support member being engageable with said upper surface of said console when said table is in said deployed position; and wherein said at least one support member is deployable between a use position in which said at least one support member projects from said in-use underside of said table and a stowed position in which at least one support member is located in or against said table.

* * * * *